(12) United States Patent
Bartram et al.

(10) Patent No.: US 8,601,451 B2
(45) Date of Patent: Dec. 3, 2013

(54) SYSTEM, METHOD, AND COMPUTER PROGRAM PRODUCT FOR DETERMINING WHETHER CODE IS UNWANTED BASED ON THE DECOMPILATION THEREOF

(75) Inventors: Anthony V. Bartram, Milton Keynes (GB); Adrian M. M. T. Dunbar, London (GB); Steve O. Hearnden, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 1296 days.

(21) Appl. No.: 11/847,162

(22) Filed: Aug. 29, 2007

(65) Prior Publication Data
US 2013/0246370 A1 Sep. 19, 2013

(51) Int. Cl.
*G06F 9/45* (2006.01)
*G06F 12/14* (2006.01)

(52) U.S. Cl.
USPC .............................. 717/146; 717/140; 726/24

(58) Field of Classification Search
None
See application file for complete search history.

(56) References Cited

U.S. PATENT DOCUMENTS

| | | | |
|---|---|---|---|
| 5,586,328 A * | 12/1996 | Caron et al. | 717/146 |
| 5,987,610 A | 11/1999 | Franczek et al. | |
| 6,073,142 A | 6/2000 | Geiger et al. | |
| 6,460,050 B1 | 10/2002 | Pace et al. | |
| 6,775,780 B1 * | 8/2004 | Muttik | 726/24 |
| 7,051,322 B2 * | 5/2006 | Rioux | 717/143 |
| 7,093,239 B1 * | 8/2006 | van der Made | 717/135 |
| 7,225,468 B2 * | 5/2007 | Waisman et al. | 726/23 |
| 7,325,251 B1 * | 1/2008 | Szor | 726/22 |
| 7,506,155 B1 | 3/2009 | Stewart et al. | |
| 7,676,842 B2 * | 3/2010 | Carmona et al. | 726/24 |
| 7,844,958 B2 * | 11/2010 | Colton et al. | 717/146 |
| 8,370,818 B2 * | 2/2013 | Osminer et al. | 717/140 |
| 2004/0111713 A1 * | 6/2004 | Rioux | 717/137 |
| 2005/0204348 A1 * | 9/2005 | Horning et al. | 717/140 |
| 2005/0268338 A1 * | 12/2005 | Made | 726/24 |
| 2006/0101282 A1 * | 5/2006 | Costea et al. | 713/188 |
| 2007/0016951 A1 * | 1/2007 | Piccard et al. | 726/24 |
| 2007/0174826 A1 * | 7/2007 | Guarraci | 717/140 |
| 2008/0034073 A1 * | 2/2008 | McCloy et al. | 709/223 |
| 2009/0013408 A1 * | 1/2009 | Schipka | 726/24 |
| 2009/0172651 A1 * | 7/2009 | Need et al. | 717/146 |

OTHER PUBLICATIONS

Ferrie et el. Hunting for metamorphic. Virus Bulletin, Sep. 2001 pp. 123-143, Retrieved on [Jul. 30, 2013] Retrieved from the Internet: URL<http://vxheaven.org/lib/pdf/Hunting%20for%20metamorphic.pdf>.*

Reps et al.Intermediate-Representation Recovery from Low-Level Code.Proceedings of the 2006 ACM SIGPLAN symposium on Partial evaluation and semantics-based program manipulation, 2006, pp. 100-111, Retrieved on [Jul. 30, 2013] Retrieved from the Internet: URL<http://dl.acm.org/citation.cfm?id=1111560>.*

* cited by examiner

*Primary Examiner* — Thuy Dao
*Assistant Examiner* — Cheneca Smith
(74) *Attorney, Agent, or Firm* — Patent Capital Group (57) ABSTRACT

A system, method, and computer program product are provided for determining whether code is unwanted based on the decompilation thereof. In use, code is identified and the code is decompiled. In addition, it is determined whether the code is unwanted, based on the decompiled code.

20 Claims, 5 Drawing Sheets

SYSTEM, METHOD, AND COMPUTER PROGRAM PRODUCT FOR DETERMINING WHETHER CODE IS UNWANTED BASED ON THE DECOMPILATION THEREOF

FIELD OF THE INVENTION

The present invention relates to code classification, and more particularly to determining whether code is unwanted.

BACKGROUND

Generally, security systems are utilized for analyzing code in order to determine whether the code is unwanted (e.g. malicious, etc.). However, such security systems have traditionally been ineffective in analyzing compiled code originally written in a high-level language (e.g. such as source code). For example, analyzing the code in a compiled, low-level form (e.g. object code) has oftentimes involved a signature-based analysis. Unfortunately, such signature-based analysis has required the code to be analyzed against numerous signatures, while still allowing false positive detections. Such false positive detections often result, at least in part, from difficulties in describing the intent of unwanted code at a low-level, utilizing such signatures, etc.

Further, decompiling low-level code originally written as high-level code (for analysis of such code in its high-level form) has customarily been a large and complex process. Thus, security systems have been incapable of employing decompilation techniques, while still providing an effective analysis of the code in a reasonable time. Even so, decompilers customarily are unable to identify the original structure of the code in its high-level form, due to obfuscation of the code during compilation, therefore preventing detection of known unwanted patterns within the code.

There is thus a need for addressing these and/or other issues associated with the prior art.

SUMMARY

A system, method, and computer program product are provided for determining whether code is unwanted based on the decompilation thereof. In use, code is identified and the code is decompiled. In addition, it is determined whether the code is unwanted, based on the decompiled code.

DETAILED DESCRIPTION

Figure 1:
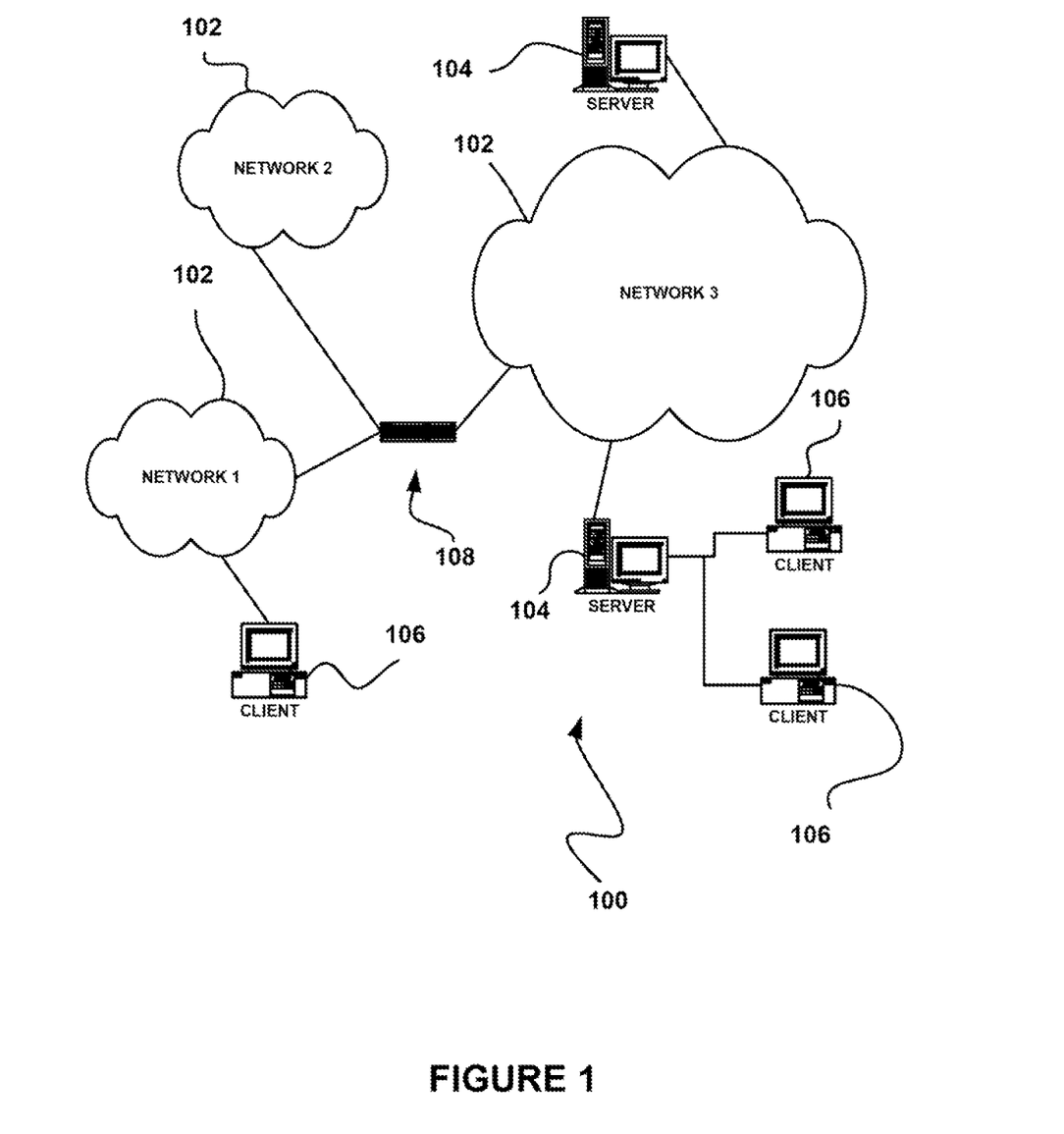
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
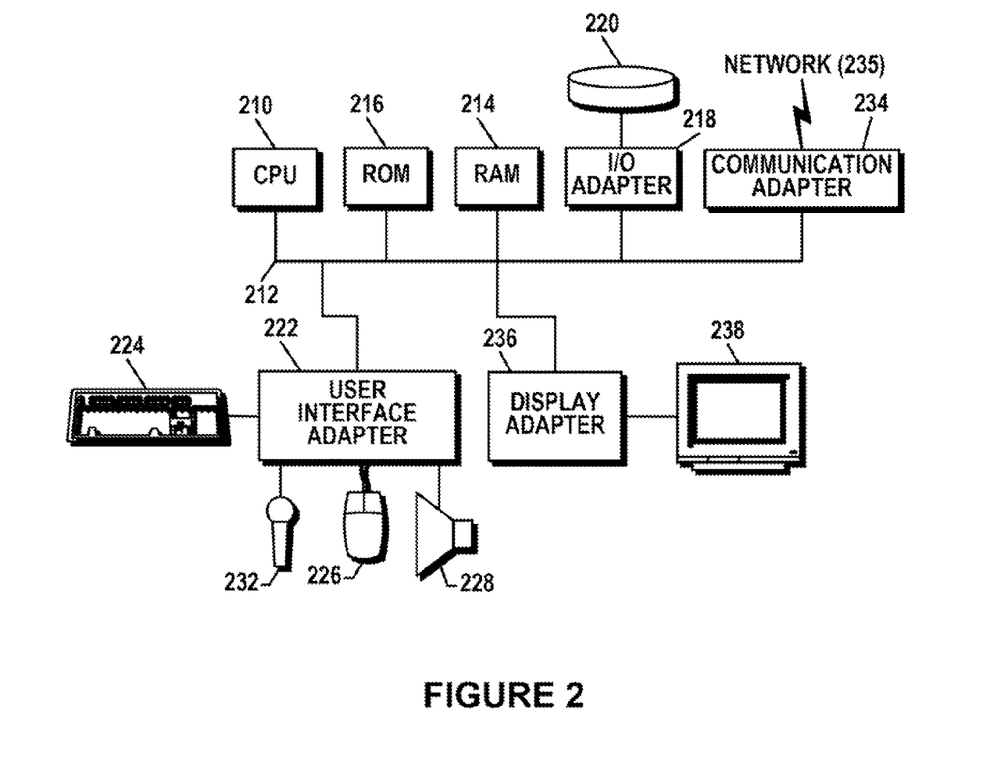
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
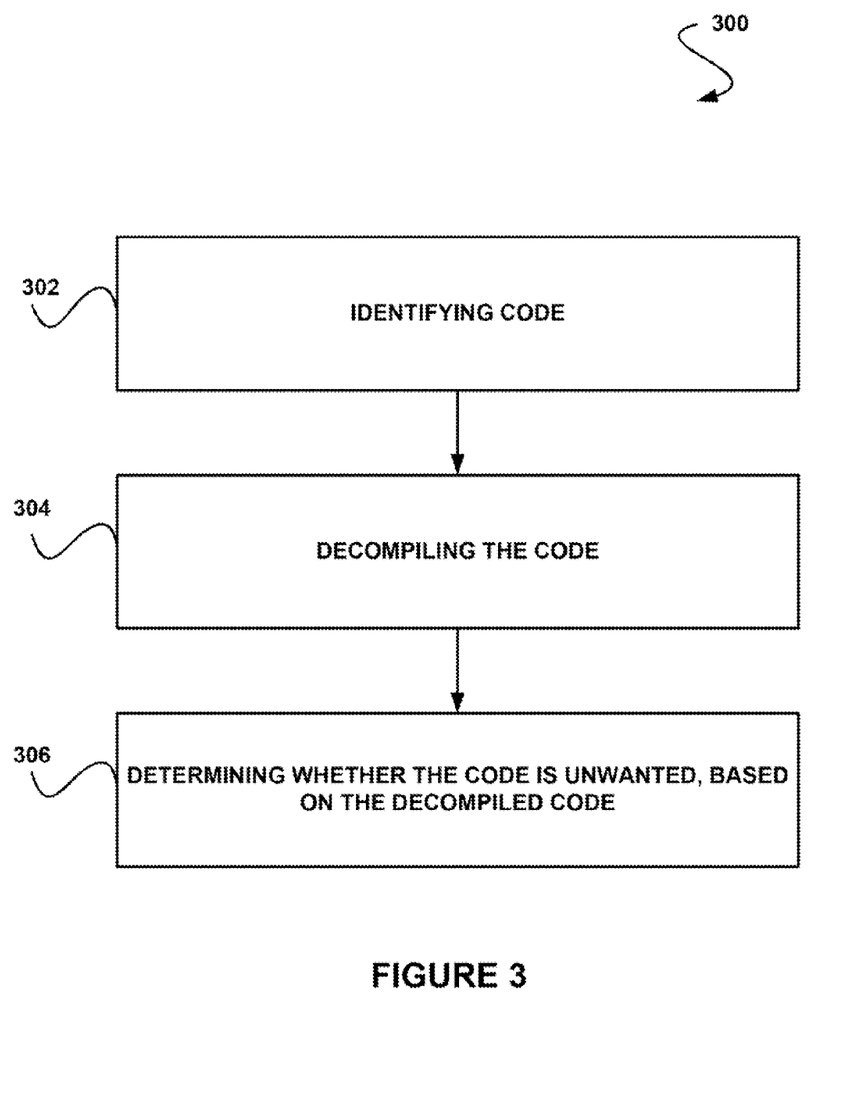
FIG. 3 shows a method for determining whether code is unwanted based on decompiled code, in accordance with one embodiment.

FIG. 3 shows a method 300 for determining whether code is unwanted based on decompiled code, in accordance with one embodiment. As an option, the method 300 may be carried out in the context of the architecture and environment of FIGS. 1 and/or 2. Of course, however, the method 300 may be carried out in any desired environment.

As shown in operation 302, code is identified. In the context of the present description, the code may be any code (e.g. computer code, etc.) capable of being decompiled. In various embodiments, the code may include machine code, assembly code, object code, executable code, etc. To this end, the code may include low-level code capable of being decompiled to a higher-level form (e.g. high-level code such as source code, etc.). Just by way of example, the code may be machine code created by compiling code (e.g. malicious code, etc.) written using a high-level language.

In addition, the code may be identified in any desired manner. For example, in one embodiment, the code may be run, traced, mapped, tagged, etc. In another embodiment, the code may be identified by scanning contents of memory (e.g. a disk storage unit, etc.). In another embodiment, the code may be identified by scanning data in a file received by a device, such as any of the devices described above with respect to FIGS. 1 and/or 2.

In yet another embodiment, the code may be identified by flagging data sent via a network connection. For example, such network may include any of the networks described above with respect to FIG. 1. In still yet another embodiment, the code may be identified by scanning data sent to a device via a connection with another device. Of course, it should be noted that, while various embodiments have been described herein, the code may be identified in any desired manner.

Additionally, as shown in operation 304, the code is decompiled. In the context of the present description, the decompiling may include any process of converting, at least in part, the code in a first form associated with a first level to a second form associated with a second level higher than the first level. Thus, for example, the code may be decompiled by converting the code from a low-level form (e.g. object code, etc.) to a higher-level form (e.g. source code, etc.).

In one embodiment, the decompiling may be an intermediate decompiling. For example, the code may be decompiled from a low-level form to an intermediate-level form. Such intermediate-level form may therefore be higher than the low-level form, but lower than (e.g. similar to but not the same as, etc.) a high-level form (e.g. an exact replica of the source code from which the object code was compiled). Just by way of example, the decompiling may include converting the code from a machine-readable form into code of an intermediate form readable by a compiler and/or a user. In various embodiments, such intermediate decompiling may be based on tracing calls in the code, tracing jumps in the code, mapping instructions in the code, etc.

For example, in one embodiment, the decompiling may include matching certain addresses and/or uses of registers associated with the code. In another embodiment, the decompiling may include analyzing patterns of instructions associated with the code. In yet another embodiment, the decompiling may include pattern matching instructions associated with the code for creating a model of the code. For example, such model may include at least an approximate representation of a structure of the code.

Furthermore, as shown in operation 306, it is determined whether the code is unwanted, based on the decompiled code. In various exemplary embodiments, unwanted code may be malware, spyware, a virus, predetermined content, etc. Of course, it should be noted that, in the context of the present description, the unwanted code may include any code that may be determined to be unwanted.

In addition, the determination of whether the code is unwanted may be made in any desired manner. In one embodiment, the determination may be based on predetermined criteria. For example, it may be determined whether aspects of the decompiled code match the predetermined criteria.

In another embodiment, the determination may be based on a comparison of the decompiled code, or optionally any portion thereof, and known unwanted code. Such known unwanted code may include any code predetermined (e.g. manually or automatically) to be unwanted. Accordingly, the code may be determined to be unwanted if the decompiled code, or optionally any portion thereof, matches the known unwanted code.

In yet another embodiment, the determination may be based on a comparison of a hash of at least a portion of the decompiled code and a hash of the known unwanted code. For example, it may be determined that the code is unwanted if the hash of the portion of the decompiled code matches the hash of the known unwanted code. In the context of the present description, the hash may refer to, but is not limited to, a pattern, a simplification, etc. (e.g. a prologue) capable of being utilized for comparison purposes.

In still yet another embodiment, the determination may be based on a comparison of the structure of the decompiled code and the known unwanted code. For example, interdependencies of portions of the decompiled code may be compared with interdependencies of portions of the known unwanted code, for determining whether a match is present. Accordingly, it may be determined that the code is unwanted, if at least a portion of the structure of the decompiled code matches at least a portion of the structure of the known unwanted code.

Optionally, the code may be determined to be unwanted, if the decompiled code at least approximately matches known unwanted code. For example, the match may be approximate, such that it may only apply to a portion of the decompiled code, as described above. As another example, the match may be approximate, such that it may only apply to a predetermined extent (e.g. a predetermined percentage match, etc.). In another example, the determination may be based on an analysis (e.g. heuristic analysis, etc.) of the decompiled code. In yet another example, the determination may be based on an execution of the decompiled code.

To this end, it is determined whether the code is unwanted, based on the decompiled code. Utilization of such decompiled code may provide for an effective and/or accurate determination of the whether the code is unwanted. For example, decompiling the code may remove potentially misleading artifacts inserted into the code by a compiler, may better convey the intent of the code as originally written, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
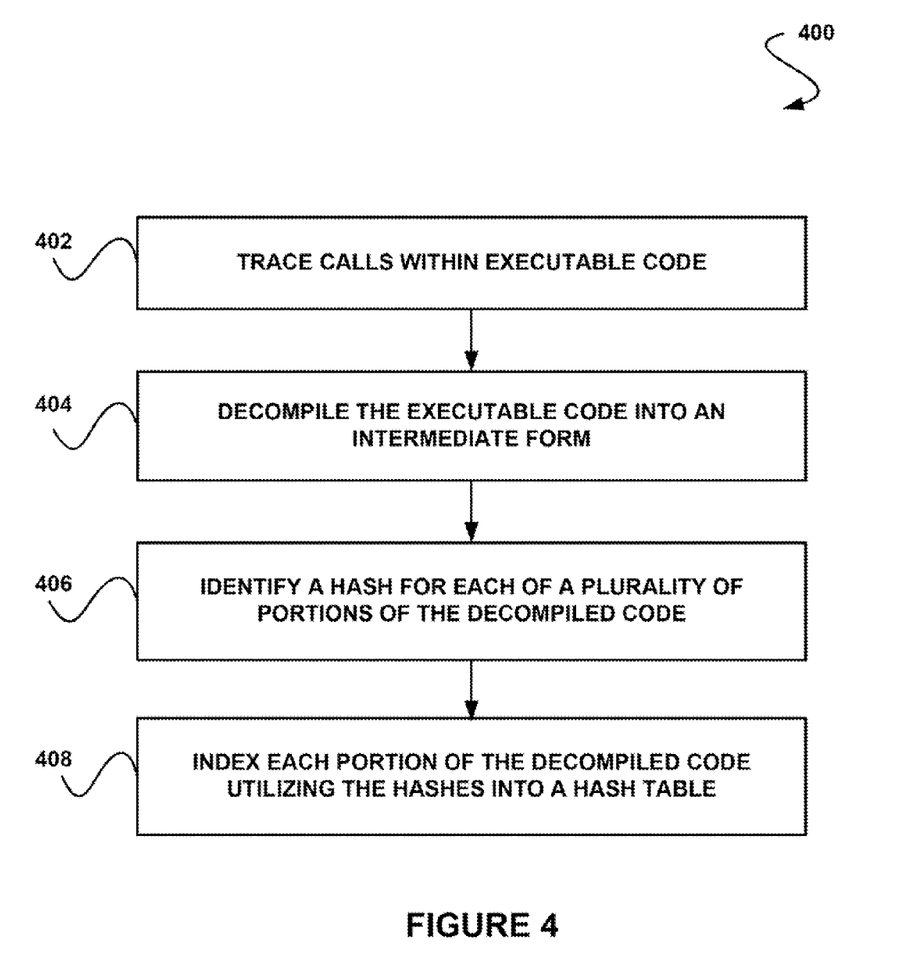
FIG. 4 shows a method for indexing portions of decompiled code into a hash table, in accordance with another embodiment.

FIG. 4 shows a method 400 for indexing portions of decompiled code into a hash table, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, calls within executable code are traced. In the context of the present embodiment, the executable code may be any code capable of being executed. For example, the executable code may be machine code, assembly code, object code, etc. In addition, the calls may each include any type of call (e.g. function call, etc.) to any portion of the executable code.

Furthermore, the calls may be traced by identifying an execution sequence of executable code portions, in one embodiment. For example, the calls may be traced from an entry point (e.g. predetermined point, etc.) of the executable code. Optionally, other instructions within the executable code, such as, for example, jumps may also be traced.

Thus, an execution sequence of portions of the executable code that are consecutively stored within the executable code or that are accessed via jump instructions may be identified. In this way, dependencies between portions of the executable code may be identified. For example, the sequence in which the executable code is stored may be different than the sequence in which the executable code executes, due to changes made to the stored sequence of the executable code during compilation. To this end, an original structure of the executable code prior to any compilation thereof may be identified via the tracing.

In addition, as shown in operation 404, the executable code is decompiled into an intermediate form. Optionally, the executable code may be decompiled into a single expanded code block. In one embodiment, the executable code may be decompiled into the intermediate form utilizing a security system (e.g. virus scanner, etc.) and/or any other mechanism.

In one embodiment, decompiling the executable code may include approximating a higher level form of the executable code. In another embodiment, decompiling the executable code may include mapping one or more states of the executable code during compilation (e.g. utilizing a compiler). In yet another embodiment, the executable code may be decompiled into an intermediate form that is not capable of being compiled.

Further, as shown in operation 406, a hash is identified for each of a plurality of portions of the decompiled code. In the context of the present embodiment, the hash may include any value determined by hashing a portion of the decompiled code. For example, the hash may be a numerical representation of a portion of decompiled code.

In addition, the plurality of portions of the decompiled code may each include any segment, fragment, etc. of the decompiled code. In one embodiment, a sliding window may be used to identify each of the portions of the decompiled code. In another embodiment, each of the portions of the decompiled code may be identified at predetermined intervals. In yet another embodiment, each of the portions of the decompiled code may be associated with a particular function. In still yet another embodiment, each of the portions of the decompiled code may be associated with code called by a single call within the executable code.

Moreover, each portion of the decompiled code is indexed utilizing the hashes into a hash table. See operation 408. In the context of the present embodiment, the hash table may be any data structure capable of containing (e.g. storing, etc.) one or more hashes. For example, the hash table may be a table, array, list, etc. Further, each portion of the decompiled code may be indexed in any manner utilizing the hashes thereof. For example, in one embodiment, the indexing may include mapping, etc. Thus, hashes within the hash table may optionally be utilized for identifying associated portions of decompiled code.

To this end, the executable code may be decompiled into an intermediate form, such that the intent of the executable code may optionally be more accurately and efficiently determined by using the decompiled code. In addition, each portion of the decompiled code may be indexed into the hash table utilizing a hash of such portion, such that the portions of the decompiled code may be referenced utilizing such hashes, as an option.

Figure 5:
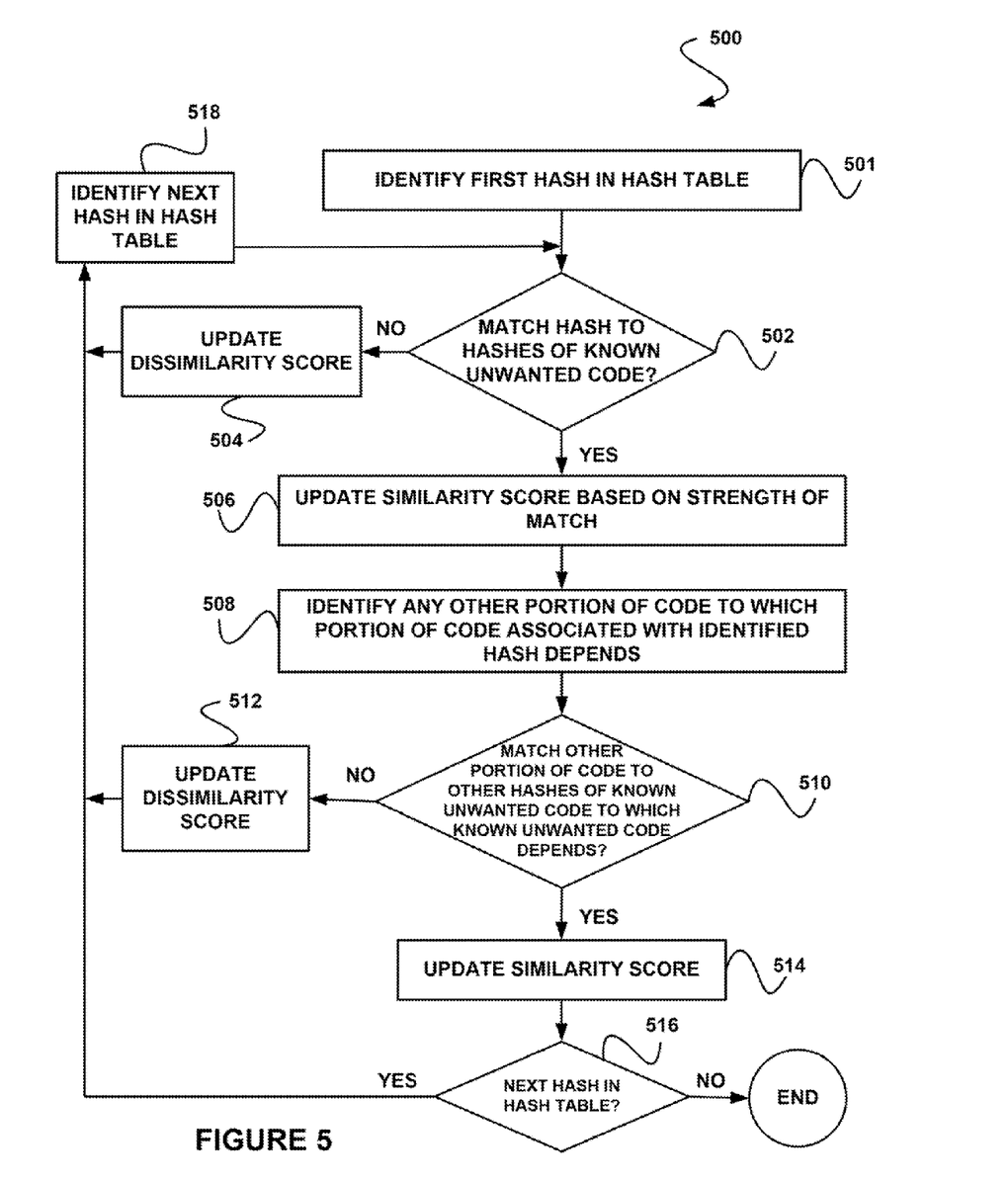
FIG. 5 shows a method for matching a hash of a portion of decompiled code to hashes of known unwanted code, in accordance with still another embodiment.

FIG. 5 shows a method 500 for matching a hash of a portion of decompiled code to hashes of known unwanted code, in accordance with another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 501, a first hash in a hash table is identified. In the context of the present embodiment, the first hash may include a hash of a portion of decompiled code. Additionally, in one embodiment, the first hash may be associated with a first index of the hash table, such that the first hash may be identified by identifying the first index of the hash table. In another embodiment, the first hash may be identified utilizing a flag associated with the first hash. Of course, the first hash may be identified in any desired manner. Optionally, the hash table from which the first hash is identified may include the hash table described in operation 408 of FIG. 4.

In response to the identification of the first hash in the hash table, it is determined whether the first hash matches hashes of known unwanted code. See decision 502. In the context of the present embodiment, such decision may include determining whether the first hash matches at least one of the hashes of known unwanted code.

Optionally, the hashes of known unwanted code may be stored in a data structure. For example, the first hash may be compared against a table of hashes of known unwanted code. In addition, in various embodiments, determining whether the first hash matches the hashes of known unwanted code may include determining whether an identical match, a partial match, an approximate match, etc. has been identified. Of course, however, the determination of whether the first hash matches hashes of known unwanted code may be made in any desired manner.

If, in decision 502, it is determined that no match is found between the hash and the hashes of known unwanted code, a dissimilarity score is updated, as shown in operation 504. In the context of the present embodiment, the dissimilarity score may be any type of score capable of indicating an amount of dissimilarity. For example, the dissimilarity score may be a percentage, an integer, a fraction, etc.

In one embodiment, the dissimilarity score may indicate the amount of dissimilarity between one or more hashes in the hash table and one or more hashes of the known unwanted code. In another embodiment, the dissimilarity score may be the amount of dissimilarity between one or more portions of decompiled code associated with the hashes in the hash table and one or more portions of the known unwanted code. To this end, the dissimilarity score may be utilized for determining whether code associated with the hashes in the hash table is unwanted. For example, such code may be determined to be wanted (e.g. non-malicious, etc.) if the dissimilarity score meets a predetermined threshold.

Furthermore, updating the dissimilarity score may include incrementing the dissimilarity score, in one embodiment. In another embodiment, updating the dissimilarity score may include recalculating the dissimilarity score using a predetermined equation. Of course, however, the dissimilarity score may be updated in any manner.

Moreover, in response to updating the dissimilarity score, a next hash in the hash table is identified, as shown in operation 518. The next hash may include any hash in the hash table that is different from the first hash. Further, such next hash may be identified such that it may be determined whether the next hash matches the hashes of known unwanted code (operation 502).

If, however, in decision 502, it is determined that the first hash matches the hashes of known unwanted code, a similarity score is updated based on a strength of the match. Note operation 506. In the context of the present description, the similarity score may be any type of score capable of indicating an amount of similarity. For example, the similarity score may be a percentage, an integer, a fraction, etc. In one embodiment, the strength of the match may include a percentage of matching between the identified hash and the hashes of known unwanted code. Of course, however, the strength of the match may indicate any degree of the match between the identified hash and the hashes of known unwanted code.

In another embodiment, the similarity score may indicate the amount of similarity between one or more of the hashes in the hash table and one or more of the hashes of known unwanted code. In yet another embodiment, the similarity score may indicate the amount of similarity between one or more portions of decompiled code associated with the hashes in the hash table and one or more portions of the known unwanted code. Moreover, the similarity score may be utilized for determining whether code associated with the hashes in the hash table is unwanted. For example, such code may be determined to be unwanted (e.g. malicious, etc.) if the similarity score meets a predetermined threshold.

In still yet another embodiment, the similarity score may be updated by incrementing the similarity score based on the strength of the match. In another embodiment, the similarity score may be updated by recalculating the similarity score using a predetermined equation. Of course, however, the similarity score may be updated in any manner.

As shown, operation 508 proceeds by identifying any other portion of code depending from the portion of code associated with the identified hash. Optionally, in the context of operation 508, the portions of code may include portions of decompiled code. Thus, the other portion of the code may include a second portion of decompiled code to which a first portion of decompiled code (associated with the identified hash) depends. In one embodiment, the portion of code may be one of the portions of the decompiled code described in operation 406 of FIG. 4.

Moreover, in one embodiment, the other portion of code may be identified based on a structure of the code. For example, the dependency between the other portion of code and the portion of code (associated with the identified hash) may be identified utilizing the structure of the code. Optionally, such structure may be identified by tracing, mapping, etc. the code (e.g. see operation 402 of FIG. 4).

In another embodiment, for example, the portion of code associated with the identified hash may depend on the other portion of code by calling the other portion of code. In another example, the portion of code associated with the identified hash may depend on the other portion of code by being called by the other portion of code. It should be noted, however, that the portion of code associated with the identified hash may depend on the other portion of code in any manner.

Optionally, the other portion of the code may be identified based on a dependency indicated by the hash table. For example, the hash table may include a trace, mapping, or other dependency information associated with the portions of the code. In this way, identifying the other portion of code may include identifying a hash of the other portion of the code utilizing the hash table.

As shown in decision 510, it is determined whether the other portion of code identified in operation 508 matches other hashes of known unwanted code (to which the known unwanted code depends). For example, the other known unwanted code (to which the known unwanted code depends) may call the known unwanted code. In another example, the other known unwanted code (to which the known unwanted code depends) may be called by the known unwanted code.

Further, decision 510 may include determining whether a hash of the other portion of code matches other hashes of known unwanted code. Accordingly, a hash of the other portion of the code may be compared with the other hashes of known unwanted code, for determining whether a match is present. To this end, a structure of the portions of code may be compared with a structure of the known unwanted code. For example, it may be determined whether hashes of interdependent portions of the code match hashes of similarly interdependent portion of known unwanted code.

If, in decision 510, it is determined that no match is found between the other portion of code identified in operation 508 and the other hashes of known unwanted code, the dissimilarity score is updated. Note operation 512. Further, if in decision 510, it is determined that the other portion of code identified in operation 508 matches at least one of the other hashes of known unwanted code, the similarity score is updated. Note operation 514. Optionally, operations 510-514 may be repeated for each of other portions of code identified in operation 508.

As shown in decision 516, it is further determined whether a next hash exists in the hash table. In the context of the present description, the next hash may be any hash in the hash table other than the currently identified hash. If, in decision 516, it is determined that a next hash exists in the hash table, then, in operation 518, the next hash is identified in the hash table.

In this way, the dissimilarity score and/or the similarity score may be updated for each hash in the hash table. As an option, it may be determined whether code associated with the hashes in the hash table is unwanted based on the dissimilarity score and/or similarity score. For example, once the dissimilarity score and/or similarity score have been updated based on all hashes in the hash table, or optionally a predetermined amount thereof, it may be determined whether the code associated with the hashes in the hash table is unwanted (based on a predetermined threshold, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A processor implemented method, comprising:
   identifying code;
   decompiling the code using a virus scanner of a security system, wherein the decompiling is an intermediate decompiling and the intermediate decompiling is based on tracing calls in the code or tracing jumps in the code;
   determining whether the code is unwanted, based on the decompiled code, wherein a determination is made that the code is unwanted if a hash of a first portion of the decompiled code matches a predetermined threshold percentage associated with a first hash of known unwanted code, and wherein the determining includes comparing interdependencies of portions of the decompiled code to interdependencies of portions of the known unwanted code;
   identifying a second portion of the decompiled code to which the first portion of the decompiled code depends, if it is determined that the hash of the first portion of the decompiled code matches the first hash of known unwanted code;
   determining whether a hash of the second portion of the decompiled code matches a second hash of known unwanted code; and
   updating a dissimilarity score associated with an amount of dissimilarity between the hash of the second portion of the decompiled code and the second hash of known unwanted code if it is determined that the hash of the second portion of the decompiled code does not match the second hash of known unwanted code.

2. The method of claim 1, wherein the code includes object code.

3. The method of claim 1, wherein the code is determined to be unwanted, if the decompiled code at least approximately matches known unwanted code.

4. The method of claim 1, wherein a portion of the decompiled code is indexed into a hash table utilizing a hash of the portion of the decompiled code.

5. The method of claim 1, wherein a similarity score is updated, if a hash of a portion of the decompiled code matches a hash of known unwanted code.

6. The method of claim 5, wherein the similarity score is updated based on a strength of the match.

7. The method of claim 1, wherein a similarity score is updated, if it is determined that the hash of the second portion of the decompiled code matches the second hash of known unwanted code.

8. A computer program product embodied on a non-transitory computer readable medium for performing operations, comprising:
   identifying code;
   decompiling the code using a virus scanner of a security system, wherein the decompiling is an intermediate decompiling and the intermediate decompiling is based on tracing calls in the code or tracing jumps in the code;
   determining whether the code is unwanted, based on the decompiled code, wherein a determination is made that the code is unwanted if a hash of a first portion of the decompiled code matches a predetermined threshold percentage associated with a first hash of known unwanted code, and wherein the determining includes comparing interdependencies of portions of the decompiled code to interdependencies of portions of the known unwanted code;
   identifying a second portion of the decompiled code to which the first portion of the decompiled code depends, if it is determined that the hash of the first portion of the decompiled code matches the first hash of known unwanted code;
   determining whether a hash of the second portion of the decompiled code matches a second hash of known unwanted code; and
   updating a dissimilarity score associated with an amount of dissimilarity between the hash of the second portion of the decompiled code and the second hash of known unwanted code if it is determined that the hash of the second portion of the decompiled code does not match the second hash of known unwanted code.

9. The computer program product of claim 8, wherein the code includes object code.

10. The computer program product of claim 8, wherein the code is determined to be unwanted, if the decompiled code at least approximately matches known unwanted code.

11. The computer program product of claim 8, wherein a portion of the decompiled code is indexed into a hash table utilizing a hash of the portion of the decompiled code.

12. The computer program product of claim 8, wherein a similarity score is updated, if a hash of a portion of the decompiled code matches a hash of known unwanted code.

13. The computer program product of claim 12, wherein the similarity score is updated based on a strength of the match.

14. The computer program product of claim 8, wherein a similarity score is updated, if it is determined that the hash of the second portion of the decompiled code matches the second hash of known unwanted code.

15. A system, comprising:
   a processor, where the system is configured for:
      identifying code;
      decompiling the code using a virus scanner of a security system, wherein the decompiling is an intermediate decompiling and the intermediate decompiling is based on tracing calls in the code or tracing jumps in the code;
      determining whether the code is unwanted, based on the decompiled code, wherein a determination is made that the code is unwanted if a hash of a first portion of the decompiled code matches a predetermined threshold percentage associated with a first hash of known unwanted code, and wherein the determining includes comparing interdependencies of portions of the decompiled code to interdependencies of portions of the known unwanted code;
      identifying a second portion of the decompiled code to which the first portion of the decompiled code depends, if it is determined that the hash of the first portion of the decompiled code matches the first hash of known unwanted code;
      determining whether a hash of the second portion of the decompiled code matches a second hash of known unwanted code; and
      updating a dissimilarity score associated with an amount of dissimilarity between the hash of the second portion of the decompiled code and the second hash of known unwanted code if it is determined that the hash of the second portion of the decompiled code does not match the second hash of known unwanted code.

16. The system of claim 15, wherein the code is determined to be unwanted, if the decompiled code at least approximately matches known unwanted code.

17. The system of claim 15, wherein a portion of the decompiled code is indexed into a hash table utilizing a hash of the portion of the decompiled code.

18. The system of claim 15, wherein a similarity score is updated, if a hash of a portion of the decompiled code matches a hash of known unwanted code.

19. The system of claim 18, wherein the similarity score is updated based on a strength of the match.

20. The system of claim 15, wherein a similarity score is updated, if it is determined that the hash of the second portion of the decompiled code matches the second hash of known unwanted code.

* * * * *